Feb. 2, 1954 T. E. ALEXANDER 2,667,926
APPARATUS FOR CEMENTING WELLS
Filed Aug. 12, 1948 3 Sheets-Sheet 1
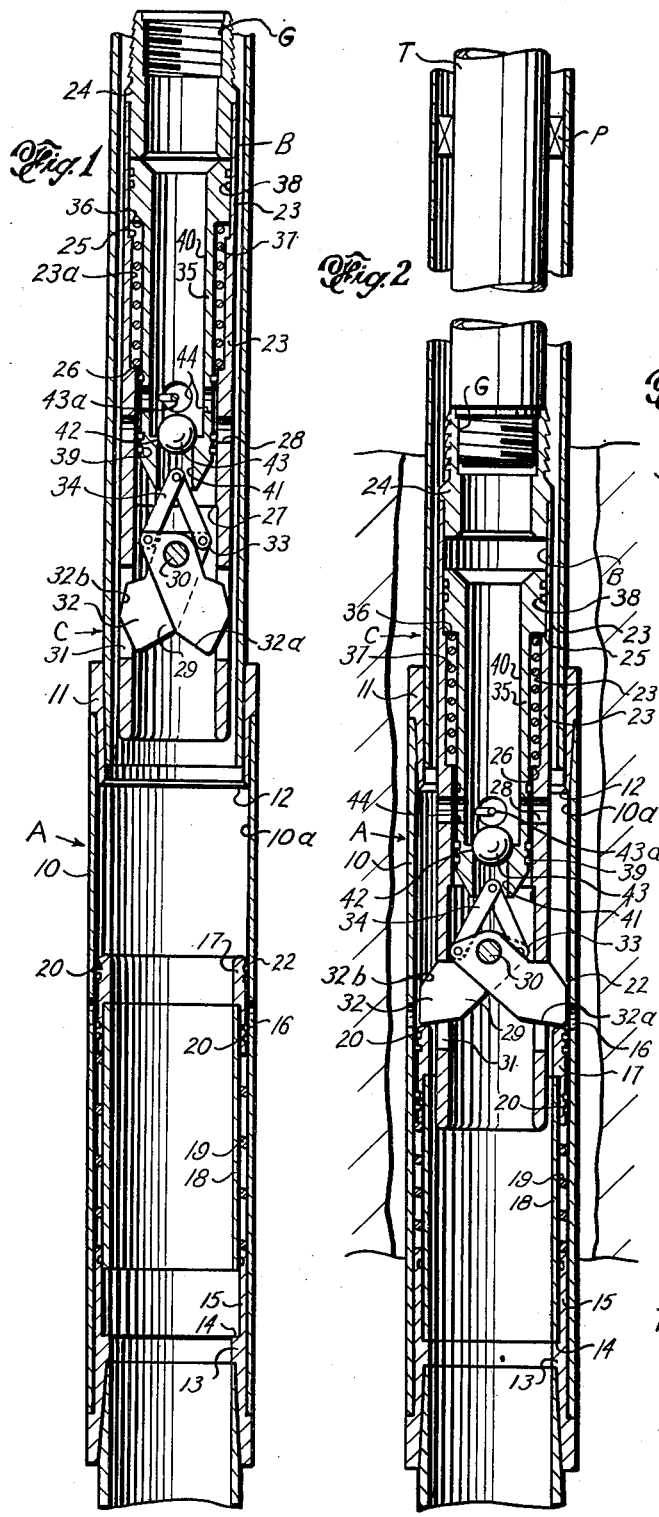
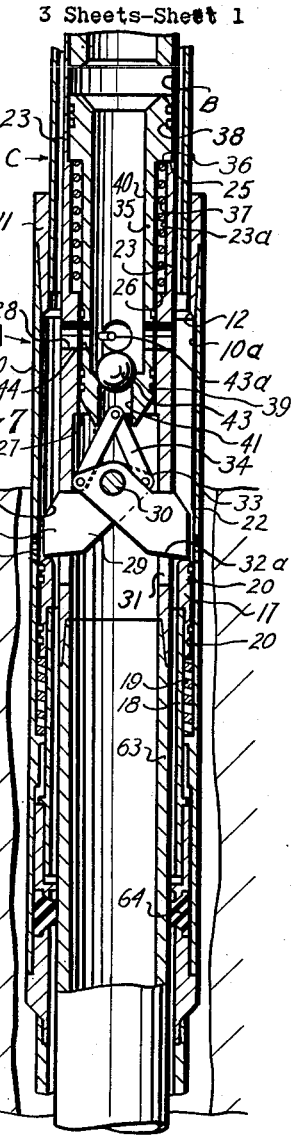
Thomas E. Alexander
INVENTOR.
BY J. Vincent Martin
and
Joe E. Edwards
ATTORNEYS

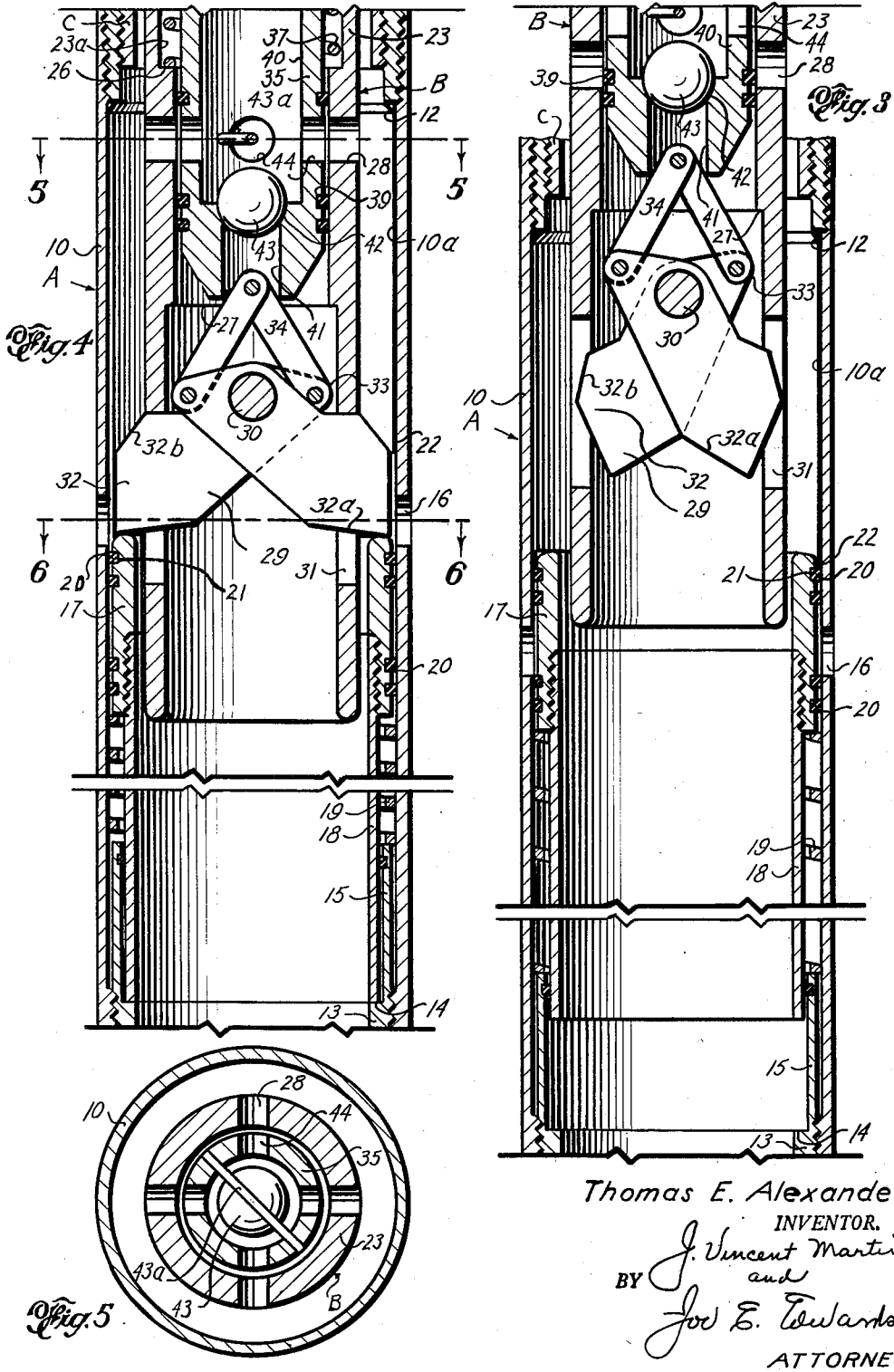

Feb. 2, 1954　　　T. E. ALEXANDER　　　2,667,926
APPARATUS FOR CEMENTING WELLS
Filed Aug. 12, 1948　　　　　　　　3 Sheets-Sheet 3
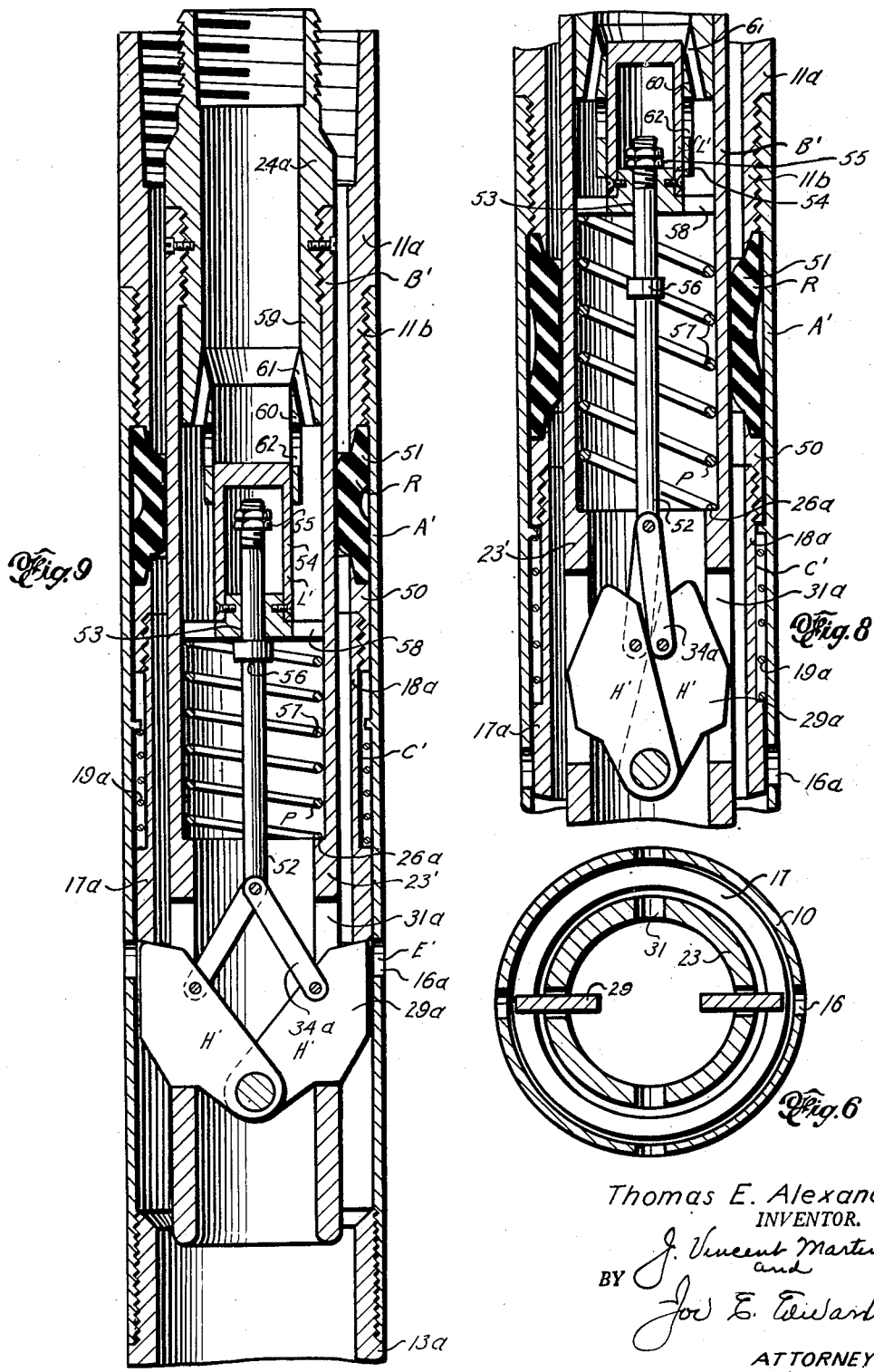
Thomas E. Alexander
INVENTOR.
BY J. Vincent Martin
and
Joe E. Edwards
ATTORNEYS Patented Feb. 2, 1954

2,667,926

UNITED STATES PATENT OFFICE 2,667,926

APPARATUS FOR CEMENTING WELLS

Thomas E. Alexander, Houston, Tex.

Application August 12, 1948, Serial No. 43,933

12 Claims. (Cl. 166—1)

This invention relates to new and useful improvements in apparatus for cementing wells.

As is well known, it has been the practice for many years to cement the lower end of the well casing within the well bore by pumping the cement downwardly through the lower end of the casing, whereby the cement may pass upwardly around the exterior of said casing. In more recent years, to obviate the well-known disadvantages incident to the passage of the cement through the entire string of casing and thence upwardly around the exterior thereof to the desired level or elevation within the well bore, multiple stage cementing has come into general use. Multiple stage cementing involves the introduction of the cementitious material through lateral ports or openings in the casing at selected or predetermined levels which eliminates the necessity of ejecting all cement through the lower end of the casing.

Various methods and apparatus for accomplishing stage or selective cementing are now in use and one of the most generally accepted consists in first cementing the lower portion of the casing in the conventional manner, that is, by pumping the cement outwardly through the lower end of the casing. The casing is then subsequently gun-perforated at the desired or selected elevations after which cement is discharged outwardly through the perforations. The cementing operation in this instance requires the use of the usual cement retainer and if "squeeze" cementing is done, a lower bridging plug must be employed. Also, the well must remain idle until the cement has set, after which the cement which has remained in the casing must be drilled out. Further, it is usually necessary to employ a casing scraper to clean the cement sheath from the casing wall and to remove the burrs ordinarily left by the gun perforator operation. After the cementing job is complete, the casing is left with the perforations closed only by the cement within such perforations, and in many instances these perforations develop leakage.

Other methods of multiple stage or selective cementing are in use but these involve the use of plugs or other obstructions within the bore of the casing and are not too satisfactory.

It is one object of the present invention to provide an improved well cementing method for selectively cementing a well casing at predetermined or desired levels or elevations within the well bore, which method overcomes the disadvantages inherent in the usual known methods of stage or selective cementing.

An important object of the invention is to provide an improved method of well cementing wherein cementing of the well casing at a predetermined selected level or elevation in the well bore may be accomplished, after which subsequent well cementing may be carried out at additional selected levels or elevations either above or below the point of initial cementing, whereby effective cementing of the casing at all desired levels in said bore may be completed in a substantially continuous procedure.

Another object of the invention is to provide an improved well cementing method whereby the lower portion of the well casing may be cemented in the conventional manner by discharging the cementitious material from the lower end of said casing, after which "stage" cementing of the casing at various levels or elevations within the well bore may be accomplished by discharging the cementitious material through lateral ports which are located at predetermined selected points in the well casing.

A further object of the invention is to provide an improved stage cementing method which includes the steps of opening lateral ports in the well casing at a selected level by means of the fluid pressure within the tubing or drill pipe extending within the casing, maintaining said ports in an open position by means of said tubing or drill pipe, then pumping a cementitious material through the open ports into the area exteriorly of the casing, and finally closing said ports after the cementing operation is complete, whereby a positive shut-off of said ports after cementing is had.

A particular object of the invention is to provide an improved apparatus for carrying out the well cementing method including a cementing collar connected in the well casing and having a valved discharge port therein which port is normally closed, together with an actuating tool adapted to co-act with the valved port to selectively open and close said port; the actuating tool being at all times controllable in its operation from the surface of the well.

Still another object of the invention is to provide a well cementing apparatus, of the character described, wherein the actuating tool which coacts with the valve normally closing the discharge port is operated from the surface and is moved into operating position by fluid pressure, or weight, and also wherein actual opening and closing of the valve is accomplished by manipulating the tubing or drill stem to which the actuating tool is connected, whereby operation of the tool as well as of the valve is at all times under control of the operator at the surface.

A still further object of the invention is to provide an improved well cementing apparatus which is so constructed that conventional cementing through the lower end of the well casing may be readily performed, after which selective or stage cementing may be carried out at desired or predetermined levels; the apparatus including an improved actuating tool arranged to co-act with valves normally closing lateral discharge ports, with said tool being of a construction which will allow said tool to pass said valves without actuating the same, whereby the tool may be moved through the valves and may be selectively operated at any level to permit true selective stage cementing to be accomplished.

Other and further objects of this invention will appear from the following description.

In the accompanying drawings which form a part of the instant specification and are to be read in conjunction therewith and wherein like reference numerals are used to indicate like parts in the various views:

Figure 1 is a view, partly in section and partly in elevation of a well cementing apparatus for carrying out the improved method, Figure 2 is a similar view illustrating the parts in a position with the cementing discharge ports in an open position, Figure 3 is an enlarged, transverse, vertical sectional view of the cementing collar and actuating tool and illustrating the valve in a position closing the discharge ports, Figure 4 is a similar view with the actuating tool engaged and maintaining the valve in a position with the discharge ports open, Figure 5 is a horizontal cross-sectional view taken on the line 5—5 of Figure 4, Figure 6 is an enlarged horizontal cross-sectional view, taken on the line 6—6 of Figure 4, Figure 7 is a view similar to Figure 1 and illustrating a modified form of apparatus which may be employed to carry out a stage cementing operation, Figure 8 is a view similar to Figure 3 of a modified form of construction showing the valve in a position closing the discharge ports, and Figure 9 is a view similar to Figure 8 illustrating the valve of this form in an open position.

In the drawings, the letter A designates a cementing or staging collar which is constructed of an elongate sleeve portion 10 having a coupling collar 11 secured to its upper end. The collar 11 is internally screw threaded and is adapted to be connected to the well casing C. The internal diameter of the coupling 11 is less than the bore 10A of the sleeve 10, whereby the lower end of the collar forms an internal annular shoulder 12 within the upper portion of the sleeve; this lower end of the collar is preferably bevelled or inclined. The lower end of the sleeve 10 has a coupling collar 13 threaded thereon and this collar is internally screw-threaded, whereby it may be connected with the casing C. An internal annular shoulder 14 is formed within the coupling collar 13 and above this shoulder, said collar is extended as indicated at 15. It will be apparent that the cementing or staging collar A may be connected within the well casing C at any desired point therein.

Intermediate its ends, the sleeve 10 is provided with a plurality of discharge ports 16 which extend radially through the wall thereof. These ports are normally closed by a sleeve valve 17, which is slidable within the bore 10A of the sleeve 10. The valve 17 is formed with an elongate depending annular skirt 18 which extends downwardly within the bore of the extension 15 of the coupling 13. A coiled spring 19 surrounds the annular skirt 18 of the valve 17 and is confined between the upper edge of the extension 15 and the under side of the valve. The spring 19 constantly exerts its pressure to urge the sleeve valve 17 upwardly, whereby said valve covers the discharge ports 16. Suitable packing rings 20 are provided on the valve sleeve, being mounted within annular grooves 21 formed in the external surface of the valve and said rings engage the wall of the bore 10A to efficiently seal or close the ports 16.

The cementing or staging collar A having the discharge port 16 therein is connected in the well casing C at the desired lever or elevation therein. It is apparent that the valve sleeve, being in close proximity to the wall of the bore 10A, does not unduly restrict the flow passage through the casing. The upward movement of the sleeve valve 17 is limited by an internal annular shoulder 22 which is formed in the bore 10A of the collar and which is spaced above the discharge ports 16. When it is desired to open the discharge ports 16 in order to direct cement outwardly through said ports into the area exteriorally of the casing, an actuating tool B is arranged to be lowered through the well casing by means of either the well tubing T or the drill stem. The actuating tool B is illustrated as connected to the lower end of the tubing but as noted, it may be connected to the lower end of the drill pipe or other conductor through which the cement is to be introduced.

The actuating tool B comprises an outer tubular body 23 having a coupling 24 threaded into its upper end, which coupling is formed with internal threads in the upper portion of its bore, whereby the tubing T may be connected therewith. The tubular body has an axial bore 23A extending entirely therethrough and nearer the upper portion of this bore an internal annular shoulder 25 is formed. A larger internal annular shoulder 26 is spaced beneath the shoulder 25 and a third internal annular shoulder 27 is also formed within the bore 23A nearer the lower end thereof. Radially disposed discharge openings or ports 28 are provided in the wall of the tubular body and are disposed between the shoulders 26 and 27.

Mounted in the lower portion of the tubular body 23 of the actuating tool B are a pair of actuating members or dogs 29. Each member has its upper portion pivotally mounted on a transverse shaft 30 which is secured within the body and which extends across the bore thereof. Thus, the actuating members or dogs 29 are mounted to swing on the shaft 30 and are adapted to be moved outwardly through elongate slots 31 which are formed in the wall of the tubular body 23. When in a retracted position, the outer portion 32 of each member is disposed within the confines of the body 23; however, upon outward swinging of the members or dogs, their outer portions 32 move outwardly through the slots 31, as is clearly shown in Figures 2 and 4.

For actuating or swinging the pivoted members 29, each member is formed with an integral ear 33 adjacent its upper end, and these ears are adapted to be connected by links 34 with the lower end of a tubular plunger or piston 35. It is noted that the links 34 are pivotally connected to the plunger, as well as to the members 29. It will be apparent that upward movement of the plunger which is mounted within the bore 23A of the tubular body 23 will function to move the members 29 to a retracted position. Similarly, downward movement of the plunger or piston 35 will impart a swinging movement to the members 29 to move their outer portions 32 outwardly through the respective slots 31. The plunger or piston 35 is slidable within the bore 23A of the tubular body 23 and extends upwardly therein. An external shoulder 36 is formed on the plunger nearer its upper end, and a coil spring 37 is confined between this shoulder and the internal shoulder 26 within the bore of the housing 23. The spring 37 constantly urges the plunger 35 toward a raised position, whereby the pivoted members 29 are normally urged toward their retracted or inward position. Suitable piston rings 38 and 39 are mounted on the plunger at the upper and lower portions thereof and serve to seal the space between said plunger and the bore 23A of the tubular housing 23.

The plunger or piston 35 is formed with an axial bore 40 extending entirely therethrough and the lower portion of this bore is reduced at 41 to form an internal annular valve seat 42. A ball valve 43 is adapted to engage the seat 42 to close the lower end of the plunger bore and upward displacement of the ball is limited by a transverse pin 43a. Above the valve seat 42, the plunger is formed with radially extending discharge ports 44 and these ports are adapted to register with the discharge ports 28 in the tubular housing 23 when the plunger is in its lowered position. When the plunger is in a raised position, as shown in Figure 3, the ports 44 are in a plane above the ports 28 whereby a flow through such ports cannot occur. However, upon lowering of the plunger and registration of the ports 44 with the ports 28, a flow from the interior of the bore of the plunger may occur outwardly through the ports and into the bore of the cementing or staging collar A. In some instances, as will be hereinafter described, the ports 44 and 28 may remain in partial registration when the plunger is in a raised or upper position.

In the operation of the device, the cementing or staging collar A is connected in the well casing at the proper level or elevation. At this time the spring 19 is holding the sleeve valve 17 in its raised position closing the discharge ports 16. When it is desired to cement through the ports 16, the actuating tool B is connected to the lower end of the tubing or drill pipe T and is lowered within the well casing. During such lowering, the coil spring 37 is holding the plunger or piston 35 in its raised or elevated position, in which position the pivoted members or dogs 29 are retracted, whereby their outer ends are within the confines or the exterior of the tubular body 23. Also, with the plunger or piston 35 in its raised position, the lateral ports 44 which extend therethrough are out of registration with the ports 28 in the tubular body. It is obvious that with the actuating members or dogs 29 in a retracted position, the actuating tool may be moved freely within the well casing and through the cementing collar A. It is noted that several of the collars A may be connected in the casing at the predetermined or selected levels or elevations where a cementing operation may be performed.

The actuating tool B is lowered to a point slightly above the particular cementing collar at which the cementing is to be carried out, and at this time, the pumps at the surface are started to apply a fluid pressure against the ball 43 which is seated within the lower end of the plunger or piston 35. This fluid pressure will overcome the spring 37 and will impart a downward movement to the plunger 35, whereby the actuating members 29 are swung on their pivot shaft 30 through the medium of the connecting links 34. The actuating members or dogs 29 are, thereby, urged outwardly toward the wall of the well casing and at the same time the ports 44 in the plunger have become aligned or registered with the ports 28 in the tubular body.

After the application of the fluid pressure, which is transmitted to the actuating members or dogs 29, the actuating tool B is moved downwardly so as to enter the cementing collar A, and as soon as the dogs move below the internal shoulder 12 within the upper portion of the collar A, said dogs expand outwardly into contact with the bore 10A of said collar. A continued downward movement of the tool will engage the inclined edges 32A of the outer portions 32 of the members 29 with the upper end of the sleeve valve 17. By imposing the weight of the tubing or drill stem T upon the valve sleeve 17 through the actuating members, the valve sleeve is moved downwardly against the tension of the spring 19 and sufficient weight is imposed to completely uncover the lateral discharge ports 16, as shown in Figure 4.

The cement to be introduced is then pumped downwardly through the tubing or drill stem and flows through the ports 44 and 28 which are in registration with each other, then downwardly through the bore 10A of the cementing collar A and finally outwardly through the discharge ports 16. It is noted that ordinarily the space between the drill pipe T and the well casing C is packed off at the well head and the cement is therefore caused to flow outwardly through the discharge ports 16. The casing string below the ports 16 is filled with drilling fluid, such as drilling mud, which is non-compressible and therefore the cement pumped downwardly through the tubing or drill stem will be directed outwardly through the discharge ports.

During the cementing operation the weight of the tubing or drill string is maintained on the valve sleeve 17 to assure that the discharge ports 16 remain open. After sufficient cement has been introduced, the tubing T is lifted to remove its weight from the tubular valve sleeve 17, whereby the spring 19 below said valve may immediately move the same upwardly to again close the discharge ports 16. The pressure within the tubing and plunger 35 is relieved and the actuating tool B is lifted upwardly. The outer portions 32 of the actuating members have their upper ends inclined or bevelled as indicated at 32B and as the tool B moves upwardly within the collar A, these inclined upper edges of the members 29 strike the internal inclined shoulder 12 within the upper end of the bore of the collar A. With the pump pressure within the plunger relieved, the engagement of the actuating members 29 with the internal shoulder 12 causes a retraction of said members, which retraction is, of course, assisted by the coil spring 37 which is urging the plunger or piston upwardly. As a matter of fact, the spring 37 may be made of sufficient strength to move the plunger to its upper position whenever the internal pressure within the tubing and plunger is relieved. This returns the parts of the actuating tool B to the position shown in Figure 3, whereby the actuating members 29 are returned to a retracted position within the tubular body. At the same time the upward movement of the plunger moves the ports 44 out of registration with the ports 28 in the tubular body. The actuating tool may then be freely moved upwardly or downwardly through the well casing.

Following the cementing operation through the discharge ports 16, it is desirable before removing the actuating tool B to clean out said tool, as well as to clean out any cement which may remain within the tubing or drill pipe. This may be done by pumping fluid downwardly through the casing C and permitting it to circulate upwardly through the actuating tool and thence to the surface through the tubing T. Of course, if desired the circulation may be downwardly through the tool and upwardly through the well casing. This circulation of fluid will clean all of the cement from the tool B and from the drill pipe so that the actuating tool is in condition for another cementing operation opposite one of the other cementing collars A which may be connected in the well casing. Since the actuating tool may readily pass through the cementing collar A when the actuating members 29 are in their retracted position, it is apparent that said tool may co-act with a cementing collar either above or below the first cementing collar through which a cementing operation was performed.

It is pointed out that the actuating tool B may be utilized to test the closure of the sleeve valve 17 following a cementing operation. After the cement has been introduced, the actuating tool may be lifted a slight distance so as to permit the sleeve valve 17 to close. A pressure may then be imparted to the ball 43 within the lower end of the plunger to move the plunger downwardly and bring the ports 44 into registration with the ports 28 in the tubular body. At such time the actuating members or dogs 29 would be urged toward the wall of the bore of the well casing. The fluid pressure would be applied through the registered ports 44 and 28 into the interior of the well casing C and also within the bore of the cementing collar A. If the sleeve valve 17 had not moved upwardly to close the ports 16 this would allow circulation downwardly through the tool and upwardly through the annulus to the surface; this circulation can generally be observed to indicate that the ports are open. In the event that the sleeve valve had not completely closed the ports, the tool B could again be lowered and a jarring action imparted to the sleeve 17 through the expanded actuating members or dogs until said sleeve is jarred loose, and its spring 19 returns it to its upper or closing position.

As has been explained, any desired number of cementing collars A may be connected in the well casing and the construction of said collars is such that the bore of the well casing string is substantially unobstructed. Therefore, if desired, it is possible to perform a conventional cementing operation prior to the stage cementing through the various collars. This would be accomplished by introducing the cement, in conjunction with a cementing plug or plugs, through the well casing prior to the time that the actuating tool and tubing B is lowered. In this manner, a conventional cementing operation adjacent the lower end of the well casing may be accomplished. Following this, the actuating tool B connected to the lower end of the tubing is run into the well casing and is utilized to co-act with the selected cementing collar A to carry out a stage cementing operation. It is obvious that there is no limit to the number of stage cementing operations which may be carried out, and also the particular order in which the various levels are cemented is entirely at the option of the operator.

In the form of the invention shown in Figures 1–6, it has been presumed that the annular space between the well casing and the tubing or drill string T is shut in at the well head and that a sufficient fluid column is present within this annular space to assure the ejection of the cement outwardly through the discharge ports 16. However, in some instances, there may be no fluid load present in the annulus or the conditions might be such that it is necessary to protect the casing string above the cementing apparatus from excessive pressure which may be applied through the tubing string; also, in some cases there may not be a pack-off around the tubing string at the surface and in these various instances, it is desirable to provide a suitable packer. In the case of the form shown in Figures 1–6, an ordinary anchor packer P could be connected in the tubing string and properly set to seal off this annular space. As is well known, a hook wall packer is expanded by the weight of the tubing and therefore, after the sleeve valve 17 has been opened and the weight of the tubing imposed upon said sleeve valve, further imposition of weight by the tubing would function to expand the packer and pack off the annulus.

Instead of the usual type of packer connected in the tubing string for packing off the annular space between the tubing and casing, the modified form of the invention, illustrated in Figures 8 and 9, could be employed. This form of the invention comprises an elongate cementing collar A' having a coupling 11A at its upper end with a coupling 13A at its lower end, whereby the collar may be connected in the well casing C. Intermediate its ends, the collar is formed with discharge ports 16A which are adapted to be closed by a sleeve valve 17A. The sleeve valve 17A is inverted as compared to the sleeve valve of the first formed in that it moves downwardly to close the ports 16A and upwardly to open said ports. A coil spring 19A normally urges the valve 17A to a closed position. The sleeve valve is formed with an upwardly extending annular skirt 18A which is connected to a metallic sleeve 50, the upper end of which confines an annular elastic packing collar 51. The upper end of the packing collar is confined by a depending annular extension 11B which is formed on the upper coupling. It will be evident that when the sleeve valve 17A is moved upwardly to uncover the ports 16A, an upward movement is also imparted to the retaining sleeve 50 connected therewith, whereby a pressure or force is applied to the lower end of the packing element 51 to distort said member inwardly.

The actuating tool B' of this form of the invention includes a tubular body 23' which has pivoted actuating members or dogs 29A mounted in its lower end. Said dogs are similar to the dogs 29 of the first form and are adapted to move outwardly through slots 31A which are formed in the lower portion of the body 23'. The dogs or members 29A are actuated by connecting links 34A which are in turn connected to an actuating rod 52. The rod 52 extends axially upwardly through the tubular body and has its upper portion extending through an axial bore 53 provided in the lower end of a piston 54. The extreme upper end of the rod 52 has nuts 55 threaded thereon while an enlarged flange 56 is formed on the rod below the piston. The piston is normally urged upwardly by means of a coil spring 57, which has its upper end engaging lateral arms 58 formed on the lower end of the piston, with its lower portion resting upon an internal shoulder 26A provided within the bore of the tubular body 23'.

A coupling 24A which is threaded into the upper end of the tubular body 23' and which makes the connection between said body and tubing or drill pipe T is formed with an annular skirt portion 59 having a cylinder 60 formed integral with its lower end. Inclined ports 61 extend through the bottom of the skirt 59 and surround the cylinder 60. The cylinder is also provided with radially directed openings 62 which are adapted to be opened and closed by the movement of the piston 54 within its cylinder.

In the operation of this form of the invention, the actuating tool B' is lowered through the well casing to a point below the cementing collar A' with which it is arranged to co-act. This collar will, of course, be at a selected or predetermined level which is the level at which the cementing is to be done. During the lowering movement, there is no pressure within the tubing string and the coil spring 57 is maintaining the piston in its raised position with the expanding or actuating dogs 29A in a retracted position. After the tool B' has moved into position below the sleeve valve 17A, a pressure is applied within the tubing or drill string T whereby the piston 54 is moved downwardly within its cylinder 60. Through the engagement of the lower end of the piston with the enlargement 56 on the actuating rod 52, said rod is moved downwardly whereby the dogs 29A are expanded. The tubing is then lifted upwardly to raise the actuating tool so that the dogs 29A engage beneath the sleeve valve 17A and move said sleeve valve upwardly to uncover the discharge ports 16A. Further upward movement of the tubing and actuating tool B' applies a force to the packing member 51, whereby said packing member is distorted into sealing engagement with the external surface of the tubular housing 23' of the actuating tool. This obviously seals off the annular space between the well casing C and the tubing or drill string T. The cement is then pumped downwardly through the tubing and passes through the inclined ports 61 as well as through the radial ports 62 into the interior of the housing 23'. From this point, the cement flows outwardly through the slots 31A and through the lower end of the housing 23' and then outwardly through the discharge ports 16A. As in the first form, the lower portion of the casing string is filled with the drilling fluid which is non-compressible which assures that the cement will pass outwardly through the ports 16A. It is pointed out that in this form of the invention the sleeve valve 17A is maintained in its open position uncovering the discharge ports 16A by maintaining the tubing in tension, rather than by imposing weight on said sleeve as in the first form. So long as the tubing is held in tension, the sleeve valve 17A is in its open position and the packing member 51 remains in its distorted or packing position.

After the cementing operation is complete, it is only necessary to lower the actuating tool B' and to relieve the internal pressure within the tubing whereby the coil spring 57 may raise the piston 54 and retract the actuating members or dogs 29A. As in the first form, the tubing and drill string may be utilized to circulate a washing fluid whereby the actuating tool may be thoroughly cleansed and any cement remaining within the well casing may be removed.

With respect to the form shown in Figures 8 and 9 wherein the upward pull on the tubing or drill pipe maintains the valve in an open position, it is pointed out that the dogs 29a and their links 34a may be connected to the transverse shaft 30 within the tubular body 23 of the actuating tool B shown in Figures 1–6. In other words, the particular type of plunger shown in the first form may be employed with the second form of the invention.

In the first form of the invention, the ports 28 and 44 have been described as closed when the plunger 23 is in its raised position and this means that the tubing or drill string must be pulled wet after actuation of the tool. It may be desirable in some instances to limit the movement of the plunger 23 so that the ports 28 and 44 will remain slightly in registration when the plunger is in its completely raised position. This slightly raised registration of the ports will not interfere with the application of fluid pressure to the plunger in moving the same downwardly, since obviously the greater volume of fluid acting on the ball will be sufficient to impart movement to the plunger, even though there is a slight discharge through the ports 28 and 44. It is apparent that such an arrangement would allow the inner string of tubing to be pulled upwardly with any fluid therein escaping through the slightly registered ports 28 and 44.

Also, with respect to the form shown in Figures 1–6, the ball valve 43a could be completely eliminated and only a restricted passage provided in place of the restricted portion 41 of the axial bore in the plunger. It will be apparent that the provision of a small passage in the lower end of the plunger would serve as a drain opening when the string is pulled, but would not materially interfere with downward movement of the plunger upon application of the fluid pressure. If such port is used, the outlet ports 28 and 44 would be completely out of registration with the plunger in a raised position.

If the ports 28 and 44 remain slightly in registration upon complete upward movement of the plunger, the lower end of the bore 40 of the plunger may be completely closed since the slightly registered ports would provide the drainage outlets upon removal of the string.

For many reasons, it is sometimes desirable to protect the formation or well casing string below the cementing collar from the pressure which may be exerted during the cementing operation through one of the cementing collars. In Figure 7, a modified form of the invention is shown which will seal off the annular space between the actuating tool B and the well casing below the discharge ports 16. In this instance, an elongate tail pipe 63 is connected to the lower end of the tubular housing 23 and extends downwardly therefrom. The lower portion of the cementing collar A is modified to mount an annular elastic packing member 64 therein, and the bore of this packer is adapted to engage the exterior of the tail pipe 63.

The operation of this form is obvious since as the actuating tool B is lowered into position to co-act with the sleeve valve 17, the elongate tail pipe 63 extends downwardly through the packing element 64. After the discharge ports have been opened, as above described, and cement is pumped downwardly, the area below the packer 64 is protected against the pressure of said cement. It is apparent that the use of the lower packer 64 may be applied to either form of the invention, that is, either to the cementing collar A illustrated in Figures 1–6 or the cementing collar A' shown in Figures 8 and 9.

The apparatus and method have been described as placing cement or cementitious material at selected points around a well casing but it is apparent that the invention may be useful in discharging plastics, acids or other materials within a well bore at desired elevations therein.

Having described the invention, I claim:

1. A well cementing apparatus including, a cementing collar adapted to be connected within a well casing and having a discharge port in its wall, a tubular valve slidably mounted within the bore of the collar and normally in a position closing said discharge port, axial sliding movement of the valve moving the same to a position opening said port, a conductor adapted to be lowered to extend axially within the casing, an actuating tool connected to the conductor, normally retracted valve-engaging means pivotally mounted upon the actuating tool, said valve-engaging means when moved into an expanded position being engageable with the tubular valve whereby subsequent movement of the actuating tool will impart sliding movement to the valve to control opening and closing of the discharge port, and movable means connected with the valve-engaging means for imparting movement to said valve-engaging means from a normally retracted to an expanded position, whereby the tubular valve is engaged by said valve-engaging means and subsequent axial movement of the conductor on which the actuating tool is mounted will operate said valve.

2. A well cementing apparatus as set forth in claim 1, wherein the means for imparting movement to the valve-engaging means is a pressure-actuated member within the actuating tool and also wherein said tool is in communication with the bore of the conductor whereby fluid pressure may be applied to the member through said conductor.

3. A well cementing apparatus including, a cementing collar adapted to be connected within a well casing and having a discharge port therein, a tubular valve slidable within the collar and normally closing the discharge port, a conductor adapted to be lowered to extend axially within the casing, an actuating tool connected to the conductor, normally retracted valve-engaging means pivotally mounted within the actuating tool, said valve-engaging means when moved into an expanded position being engageable with the tubular valve whereby subsequent axial movement of the actuating tool will impart sliding movement to the valve to control opening and closing of said discharge port, pressure responsive means movable within the actauting tool and connected with the valve-engaging means, operation of said pressure responsive means moving said actuating means into expanded position, subsequent lowering of the conductor engaging the actuating means with the tubular valve to open said discharge port, the weight of the conductor functioning to maintain the port open.

4. A well cementing apparatus as set forth in claim 1, together with means for packing off the annular space between the well casing and the conductor at a point above the discharge port.

5. A well cementing apparatus as set forth in claim 1, together with means for packing off the annular space between the well casing and the conductor at a point below the discharge port.

6. A well cementing apparatus including, a cementing collar adapted to be connected within a well casing and having a discharge port in its wall, a tubular valve movable axially within the bore of the collar and normally in a position closing said discharge port, axial movement of the valve moving said valve to a position opening said port, a conductor adapted to be lowered to extend axially within the casing, an actuating tool connected to the conductor and including a pressure-operated piston therein, normally retracted valve-engaging means mounted on the actuating tool, a pivoted linkage connection between the valve-engaging means and the piston whereby movement of the piston will move the valve-engaging means to expanded or retracted position, said valve-engaging means when moved into expanded position being engageable with the tubular valve to connect the actuating tool and conductor with the valve, whereby subsequent manipulation of the conductor will control the axial movement of the valve to thereby control opening and closing of the discharge port.

7. A well cementing apparatus including, an elongate cementing collar adapted to be connected within a well casing and having a discharge port in its wall, a sleeve valve slidable within the collar and normally in a position closing the discharge port, a conductor adapted to be lowered to extend axially within the well casing, an actuating tool connected to the conductor and lowered therewith, retractable actuating means mounted in the actuating tool and normally in a retracted position so as to be wholly within the confines of said tool, whereby said tool may be moved freely through the collar and sleeve valve therein, and expanding linkage connected with the actuating means, a movable pressure-responsive member within the tool connected to the linkage to operate said linkage and expand the actuating means, whereby subsequent manipulation of the conductor will cause said expanded actuating means to engage the sleeve valve to control opening and closing of the discharge port.

8. A well cementing apparatus as set forth in claim 7, together with means on the actuating tool adapted upon downward movement of the tool relative to the expanded actuating means to engage the expanded actuating means to thereby set up a connection between the tool and the actuating means, whereby a downward force on the tool by imposing the weight of the conductor thereon will be transferred through the expanded actuating means directly to the sleeve valve so that the weight of said conductor will maintain the sleeve valve in a position uncovering the discharge port.

9. A well cementing apparatus as set forth in claim 7, together with means on the actuating tool adapted upon upward movement of the tool relative to the expanded actuating means to engage the expanded actuating means to set up a connection between the tool and the actuating means, whereby an upward force on the tool occasioned by an upward pull on the conductor will be transferred through the expanded actuating means directly to the sleeve valve so that an upward tension on the conductor will maintain the sleeve valve in a position uncovering the discharge port.

10. A well cementing apparatus including, a cementing collar adapted to be connected within a well casing and having a discharge port therein, a tubular valve slidable within the collar and normally closing the discharge port, a conductor adapted to be lowered to extend axially within the casing, an actuating tool connected to the conductor, actuating means mounted in the tool for movement from an inward retracted position to a radially outward expanded position, said actuating means when moved to an expanded position being engageable with the tubular valve so that subsequent upward movement of the actuating means relative to the cementing collar will engage the valve to move said valve and control opening and closing of the discharge port, a pressure-responsive member movable within the actuating tool and operable by a pressure fluid pumped downwardly through the conductor, a connection between the pressure-responsive member and the actuating means whereby operation of the pressure-responsive member by the application of pressure thereto causes a movement of the actuating means into expanded position, subsequent upward lifting of the conductor and tool functioning to engage said expanded actuating means with the tubular valve to move said valve and open the discharge port, and means on the actuating tool engageable with the expanded actuating means for transferring an upward force from the conductor directly through the actuating means to the valve, whereby a pulling tension on the conductor will maintain the valve in a position holding the discharge port open.

11. A well cementing apparatus including, a cementing collar adapted to be connected within a well casing and having a discharge port in its wall, a tubular valve slidably mounted within the bore of the collar and normally in a position closing said discharge port, axial sliding movement of the valve moving the same to a position opening said port, a conductor adapted to be lowered to extend axially within the casing, an actuating tool connected to the conductor, normally retracted valve-engaging means for movement from an inward retracted position to a radially outward expanded position mounted upon the actuating tool, said valve-engaging means when moved into an expanded position being engageable with the tubular valve whereby subsequent movement of the actuating tool will impart sliding movement to the valve to control opening and closing of the discharge port, and movable means connected with the valve-engaging means for imparting movement to said valve-engaging means from a normally retracted to an expanded position, whereby the tubular valve is engaged by said valve-engaging means and subsequent axial movement of the conductor on which the actuating tool is mounted will operate said valve.

12. A well cementing apparatus as set forth in claim 11, wherein the means for imparting movement to the valve-engaging means is a pressure-actuated member within the actuating tool and also wherein said tool is in communication with the bore of the conductor whereby fluid pressure may be applied to the member through said conductor.

THOMAS E. ALEXANDER.

References Cited in the file of this patent

UNITED STATES PATENTS

| Number | Name | Date |
| --- | --- | --- |
| 2,187,480 | Baker | Jan. 16, 1940 |
| 2,187,483 | Baker | Jan. 16, 1940 |
| 2,223,442 | Crowell | Dec. 3, 1940 |
| 2,344,120 | Baker | Mar. 14, 1944 |
| 2,380,022 | Burt | July 10, 1945 |
| 2,384,675 | Hammer | Sept. 11, 1945 |
| 2,431,751 | Hayward | Dec. 2, 1947 |
| 2,526,695 | Schlumberger | Oct. 24, 1950 |